United States Patent
Xia et al.

(10) Patent No.: US 10,244,553 B2
(45) Date of Patent: Mar. 26, 2019

(54) DATA SENDING METHOD AND DEVICE IN SPECTRUM AGGREGATION

(71) Applicant: ZTE Corporation, Shenzhen, Guangdong (CN)

(72) Inventors: Shuqiang Xia, Shenzhen (CN); Bo Dai, Shenzhen (CN); Chunli Liang, Shenzhen (CN); Weiwei Yang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 124 days.

(21) Appl. No.: 15/427,354

(22) Filed: Feb. 8, 2017

(65) Prior Publication Data

US 2017/0150518 A1 May 25, 2017

Related U.S. Application Data (62) Division of application No. 14/914,970, filed as application No. PCT/CN2014/080124 on Jun. 17, 2014, now Pat. No. 9,888,494.

(30) Foreign Application Priority Data

Sep. 27, 2013 (CN) .......................... 2013 1 0452502

(51) Int. Cl.
*H04W 72/12* (2009.01)
*H04L 5/00* (2006.01)
(Continued)

(52) U.S. Cl.
CPC ....... *H04W 72/1289* (2013.01); *H04L 1/1854* (2013.01); *H04L 1/1887* (2013.01);
(Continued)

(58) Field of Classification Search
None
See application file for complete search history.

(56) References Cited

U.S. PATENT DOCUMENTS

| | | |
|---|---|---|
| 2012/0257552 A1 | 10/2012 | Chen |
| 2012/0263128 A1 | 10/2012 | Hu |

(Continued)

FOREIGN PATENT DOCUMENTS

| | | |
|---|---|---|
| CN | 102045862 A | 5/2011 |
| CN | 102291227 A | 12/2011 |

(Continued)

OTHER PUBLICATIONS

International Search Report in international application No. PCT/CN2014/080124, dated Sep. 2, 2014, 2 pgs.
(Continued)

*Primary Examiner* — Mohammad S Adhami
(74) *Attorney, Agent, or Firm* — Cooper Legal Group, LLC (57) ABSTRACT

Provided are a data sending method and device in spectrum aggregation. When downlink aggregation is performed on the plurality of cells of different types, the method includes that: HARQ information of the plurality of cells is centralized and sent on uplink subframes corresponding to a TDD cell among the plurality of cells, wherein the TDD cell is a primary cell while other cells are secondary cells and it is given that an uplink-downlink configuration of the primary cell is configuration X, where X∈{0,1,2,3,4,5,6}, downlink subframes are configured on each FDD cell for a UE so that a network can send a PDCCH/a PDSCH for the UE only on the configured downlink subframes while the UE detects and receives the PDCCH/PDSCH on the configured downlink subframes.

8 Claims, 4 Drawing Sheets

(51) Int. Cl.
  *H04L 5/14* (2006.01)
  *H04L 1/18* (2006.01)
(52) U.S. Cl.
  CPC ............ *H04L 5/001* (2013.01); *H04L 5/0055* (2013.01); *H04L 5/1469* (2013.01); *H04W 72/1268* (2013.01)

(56) References Cited

U.S. PATENT DOCUMENTS

| | | | |
|---|---|---|---|
| 2013/0028149 | A1 | 1/2013 | Chen |
| 2014/0119246 | A1* | 5/2014 | Yin ................. H04W 72/12 370/280 |
| 2014/0153451 | A1 | 6/2014 | Lin |
| 2014/0161002 | A1 | 6/2014 | Gauvreau |
| 2015/0009872 | A1* | 1/2015 | Yang ................. H04J 3/00 370/280 |
| 2016/0013896 | A1* | 1/2016 | Sun ................. H04L 1/1854 370/280 |
| 2016/0337090 | A1 | 11/2016 | Gauvreau et al. |

FOREIGN PATENT DOCUMENTS

| | | | |
|---|---|---|---|
| CN | 102299765 | A | 12/2011 |
| KR | 20130071485 | A | 6/2013 |
| RU | 2407201 | C2 | 12/2010 |
| RU | 2461982 | C1 | 9/2012 |
| RU | 2473174 | C2 | 1/2013 |
| WO | 2012061257 | A1 | 5/2012 |
| WO | 2012109195 | A2 | 8/2012 |
| WO | 2012113345 | A1 | 8/2012 |
| WO | 2012142123 | A2 | 10/2012 |
| WO | 2013007152 | A1 | 1/2013 |

OTHER PUBLICATIONS

English Translation of the Written Opinion of the International Search Authority in international application No. PCT/CN2014/080124, dated Sep. 2, 2014, 7 pgs.

"Control Channel Design for Carrier Aggregation between LTE FDD and LTE TDD Systems", Yong Le, Qin Muy, Liu Liu, Lan Chen, Mugen Peng and Wenbo Wang, May 2012, IEEE 75th Vehicular Technology Conference (VTC Spring 2012) : Yokohama, Japan, IEEE,Piscataway,NJ, XP032202278, DOI: 10.1109/VETECS.2012.6239853 ISBN: 978-1-4673-0989-9, 6 pgs.

"Cross-carrier scheduling and HARQ timing for different TDD UL-DL configurations", Mar. 2012, 3GPP Draft; R1_121700,3rd Generation Partnership Project (3GPP),Mobile Competence Centre; 650,Route Des Lucioles;F-06921 Sophia-Antipolis Cedex;France,vol. RAN WG1, No. Jeju Island, Korea; 20120326-20120330, 8 pgs.

"CA-based aspects for FDD-TDD joint operation". Aug. 2013, 3GPP Draft; R1-133372 LGE-CA-Based FDD TDD, 3rd Generation Partnership Project (3GPP), Mobile Competence Centre; 650, Route Des Lucioles ; F-06921 Sophia-Antipolis Cedex ; France, vol. RAN WG1, No. Barcelona,Spain; 20130819-20130823, Retrieved from the Internet:URL:http://3gpp.org/ftp/tsg_ran/WG1_RL1/TSGR1_74/Docs/, 4 pgs.

The Partial Supplementary European Search Report in European application No. 14849120.2, dated Sep. 23, 2016, 9 pgs.

"Discussion on FDD-TDD joint operation solutions[online]", Aug. 2013, 3GPPTSG-RAN WG1#74 R1-133184, URL:http://www.3gpp.org/ftp/tsg_ran/WG1_RL1/TSGR1_74/Docs/R1-133184.zip, 7 pgs.

Supplementary European Search Report in European application No. 14849120.2, dated Dec. 16, 2016, 15 pgs.

* cited by examiner

DATA SENDING METHOD AND DEVICE IN SPECTRUM AGGREGATION

CROSS REFERENCE TO RELATED APPLICATIONS

This is a divisional application of U.S. application Ser. No. 14/914,970 filed on Feb. 25, 2016, which itself is based on International Patent Application No. PCT/CN2014/080124 filed on Jun. 17, 2014, which claims priority to Chinese Patent Application No. 201310452502.3 filed on Sep. 27, 2013, the disclosure of all of which is incorporated by reference herein in its entirety.

TECHNICAL FIELD

The present disclosure relates to a wireless communication technology, particularly to a data sending method and device in spectrum aggregation.

BACKGROUND

Figure 1:
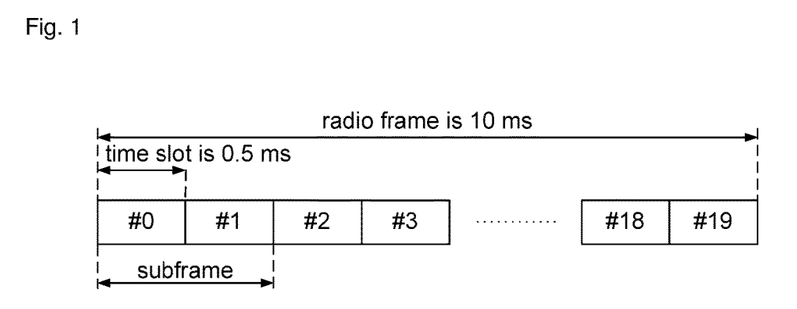
FIG. 1 is a schematic diagram of a frame structure in an FDD system according to the traditional art.

Radio frames in a Long Term Evolution (LTE) system and an LTE-Advanced (LTE-A) system include frame structures of a Frequency Division Duplex (FDD) mode and a Time Division Duplex (TDD) mode. FIG. 1 is a schematic diagram of a frame structure in an existing LTE/LTE-A FDD system. As shown in FIG. 1, a radio frame of 10 milliseconds (ms) consists of 20 slots having a length of 0.5 ms and numbered from 0 to 19, and a subframe i having a length of 1 ms is formed by the slot 2i and the slot 2i+1.

Figure 2:
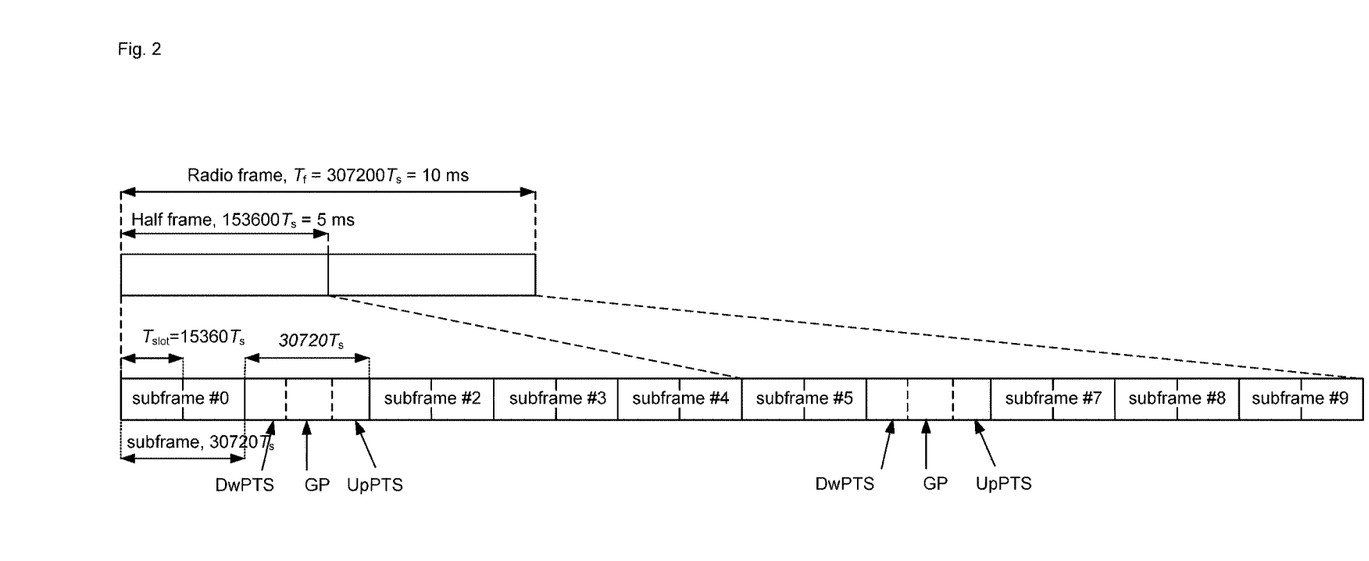
FIG. 2 is a schematic diagram of a frame structure in a TDD system according to the traditional art.

FIG. 2 is a schematic diagram of a frame structure in an existing LTE/LTE-A TDD system. A radio frame of 10 ms consists of two half frames having a length of 5 ms, either of which includes 5 subframes having a length of 1 ms. A subframe i is defined as two slots which are 2i and 2i+1 respectively having a length of 0.5 ms, and an uplink-downlink configuration supported by the subframe is as shown in Table 1:

TABLE 1

| Uplink-downlink configuration | Uplink-downlink Transition point cycle | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | where for each subframe in a radio frame, "D" represents a dedicated subframe for downlink transmission, "U" represents a dedicated subframe for uplink transmission, "S" represents a special subframe, including three parts, a Downlink Pilot Time Slot (DwPTS), a Guard Period (GP) and an Uplink Pilot Time Slot (UpPTS).

In the two frame structures above, a time slot in a normal Cyclic Prefix (CP) includes 7 symbols having a length of 66.7 microseconds (us), in which the CP length of a first symbol is 5.21 us, and the CP length of the remaining 6 symbols is 4.69 us; and a time slot in an Extended CP includes 6 symbols, and the CP length of all symbols is 16.67 us.

In the LTE/LTE-A system, a Hybrid Automatic Repeat Request (HARQ) process includes that when a base station or a terminal needs to transmit data, the base station sends the data through downlink signaling and distributes information required by the transmission, such as resource allocation information. The sender sends the data according to the information while saving the data in a cache of the sender itself for retransmission. After receiving the data, a receiver detects the data, and sends Acknowledged (ACK) information to the sender if the data is received correctly. After receiving the ACK information, the sender clears the cache used in the transmission and terminates the transmission. If the data is not received correctly, Non-Acknowledged (NACK) is sent to the sender, and a packet not received correctly is saved in a cache of the receiver. After receiving the NACK, the sender extracts the data from its cache, and retransmits the data with a specific packet format on a corresponding subframe and a corresponding frequency-domain position. After receiving the retransmitted packet, the receiver combines the retransmitted packet with the packet that is not correctly received previously and performs detection again. Subsequently, the process above is repeated until the data is received correctly or the number of transmission times exceeds a maximum number threshold of transmission times.

In the LTE/LTE-A system, timing of scheduling for a Physical Downlink Share Channel (PDSCH) in a downlink HARQ follows the following rule, that is, scheduling for the downlink HARQ follows the following rule: a User Equipment (UE) detects a Physical Downlink Control Channel (PDCCH) on a subframe n and receives and detects a PDSCH on a current subframe according to information of the PDCCH.

In an LTE/LTE-A FDD system, transmission of HARQ-ACK of a PDSCH in a downlink HARQ, that is, a timing relation of the downlink HARQ follows the following rule: a UE detects transmission of a PDSCH on a subframe n, or instructs a PDCCH of downlink Semi-Persistent Scheduling (SPS) release, and transmits a corresponding HARQ-ACK response on a subframe n+4. In an LTE/LTE-A TDD system, a timing relation of a downlink HARQ follows the following rule: a UE detects transmission of a PDSCH on a subframe n−k or instructs a PDCCH on downlink SPS release, and transmits a corresponding HARQ-ACK response on an uplink subframe n, wherein k belongs to K, and the values of K in different uplink-downlink configurations are as shown in Table 2.

TABLE 2

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE/LTE-A FDD system, an HARQ timing of a Physical Uplink Share Channel (PUSCH) is stipulated as follows: given that the UE detects HARQ information on a downlink subframe n, then the information corresponds to a PUSCH that needs to be sent by the UE on an uplink subframe n−4.

In the LTE/LTE-A TDD system, an HARQ timing of a PUSCH is stipulated as follows.

Given that the UE detects HARQ information on a downlink subframe n, the information may be sent through a PDCCH or a Physical HARQ Indicator Channel (PHICH). In uplink-downlink configurations 1 to 6 and configuration 0 (I_PHICH parameter=0), the information corresponds to a PUSCH sent by the UE on an uplink subframe n−k. The values of k in different uplink-downlink configurations for different uplink-downlink configuration and subframe indexes are as shown in Table 3.

TABLE 3

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | | 6 | | | | | | | 6 | 6 |
| 4 | | | | | | | | | 6 | 6 |
| 5 | | | | | | | | 6 | | |
| 6 | | 6 | 4 | | | | 7 | 4 | | 6 |

In uplink-downlink configuration (I_PHICH parameter=1), given that the UE detects HARQ information on a downlink subframe n, then the information corresponds to a PUSCH sent by the UE on a uplink subframe n−6. Since uplink and downlink subframes are in one-to-one correspondence in the LTE/LTE-A FDD system, the UE needs to feed back ACK/NACK response information of 1 bit when a PDSCH only includes one transmission block, and the UE needs to feed back ACK/NACK response information of 2 bits when the PDSCH includes 2 transmission blocks. The UE uses Physical Uplink Control Channel (PUCCH) format 1a/1b to send ACK/NACK response information of half a bit. Since uplink and downlink subframes are not in one-to-one correspondence in the LTE/LTE-A TDD system, ACK/NACK response information corresponding to a plurality of downlink subframes needs to be sent on a PUCCH of an uplink subframe, wherein a set of downlink subframes corresponding to the uplink subframe form a "bundling window". The ACK/NACK response information is sent by two ways. The first one is bundling, and the core idea of this way is to perform logics and an operation on the uplink frame-fed back ACK/NACK response information of transmission blocks corresponding to the downlink subframes. If a downlink subframe has 2 transmission blocks, the UE needs to feed back ACK/NACK response information of 2 bits, and if each subframe only has 1 transmission block, the UE needs to feed back ACK/NACK response information of 1 bit. The UE applies PUCCH format 1a/1b to send the ACK/NACK response information of 1 or 2 bits. The other way is multiplexing (multiplexing with channel selection). The core idea of this way is to use different PUCCH channels and modulation symbols on the channels to represent different uplink subframe-fed back feedback states of the downlink subframes. If there are a plurality of transmission blocks on a downlink subframe, logics and spatial bundling are performed on ACK/NACK fed back by the plurality of transmission blocks of the downlink subframe first and channel selection is performed subsequently. The UE applies format 1b with channel selection to send the ACK/NACK response information.

Compared with an LTE system, the most significant characteristic of an LTE-A system is that the LTE-A system introduces a carrier aggregation technology. In other words, bandwidths of the LTE system are aggregated to acquire a larger bandwidth. In the system in which carrier aggregation is introduced, an aggregated carrier is called a Component Carrier (CC), also known as a cell. In the meanwhile, the concept of a Primary Component Carrier/Cell (PCC/PCell) and a Secondary Component Carrier/Cell (SCC/SCell) is also proposed. The system with carrier aggregation at least includes a primary cell and a secondary cell, wherein the primary cell is always in an activated state and it is stipulated that downlink HARQ information is transmitted only on a Pcell.

In an LTE-A carrier aggregation system, 2 sending methods are defined to send an HARQ-ACK response message on a PUCCH: PUCCH format 1b with channel selection and PUCCH format 3. If a UE configured with a plurality of serving cells can only aggregate 2 serving cells maximally, the UE will send HARQ-ACK by means of PUCCH format 1b with channel selection when configuring the plurality of serving cells, and if the UE is able to support aggregation of more than 2 serving cells, a base station will further uses signaling of a higher layer to configure whether the UE sends HARQ-ACK response information by means of PUCCH format 1b with channel selection or PUCCH format 3 when the UE configures the plurality of serving cells.

An existing carrier aggregation technology is only applied to an FDD cell or a TDD cell. However, an operator generally has an FDD spectrum and a TDD spectrum at the same time during practical application. Therefore, it is of great importance to support aggregation of an FDD cell and a TDD cell so as to improve spectral efficiency and user experience. In this process, selection of a type of an HARQ timing to send a PDSCH/PUSCH of each cell after aggregation of the FDD cell and the TDD cell is of crucial significance for effective aggregation of the FDD cell and the TDD cell. A common solution in the traditional art may be called a "double mode" solution. That is, a PDSCH/PUSCH of a TDD cell is processed according to an HARQ timing of existing LTE/LTE-A TDD while a PDSCH/PUSCH of an FDD cell is processed according to an HARQ timing of existing LTE/LTE-A FDD. However, this solution has big defects, specifically described as follows:

1, when a network performs downlink aggregation on a plurality of cells (including at least one FDD cell and at least one FDD cell) for a UE, the solution requires that the UE has the ability to feed back an HARQ on two cells at the same time, which reduces the power amplification efficiency and uplink coverage of the UE and increases the cost for implementing the UE; and 2, advantages of cross carrier scheduling cannot be fully supported and utilized. For example, a PDSCH/PUSCH cannot be supported on an FDD cell, and a corresponding PDCCH cannot be supported on a TDD cell, which is unfavorable for full utilization of resources of the two types of cells after aggregation of the FDD cell and the TDD cell, thus further limiting improvement of the aggregation performance of the FDD cell and the TDD cell.

Therefore, a method is provided here to effectively aggregate an FDD cell and a TDD cell, thus effectively solving the problem above, fully and effectively utilizing FDD and TDD resources, and facilitating implementation of existing base station and terminal.

SUMMARY

In view of this, the embodiments of the present disclosure propose to provide a data sending method and device in spectrum aggregation, so as to send data when aggregation is performed on FDD and TDD simultaneously, thus fully and effectively utilizing TDD and FDD resources while facilitating implementation of a base station and a terminal.

The technical solutions of the embodiments of the present disclosure are implemented by the following way.

A data sending method in spectrum aggregation, in which a plurality of cells are configured for a UE and the plurality of cells at least include one TDD cell and at least one FDD cell.

When downlink aggregation is performed on the plurality of cells of different types, the method includes that:

downlink HARQ information of the plurality of cells is centralized and sent on uplink subframes corresponding to one TDD cell among the plurality of cells, wherein the TDD cell is a primary cell while other cells are secondary cells and it is given that an uplink-downlink configuration of the primary cell is configuration X, where $X \in \{0,1,2,3,4,5,6\}$;

downlink subframes are configured in each FDD cell for the UE; it is agreed that a network sends a PDCCH/a PDSCH for the UE only on the configured downlink subframes while the UE detects and receives the PDCCH/PDSCH on the configured downlink subframes;

the network and the UE agree that the UE believes that there is no PDCCH/PDSCH sent to the UE on one or more downlink subframes while there may be a PDCCH/PDSCH sent to the UE on a subframe besides the downlink subframes.

The method may further include that the network and the UE agree that an HARQ timing of a PDSCH in uplink-downlink configuration $Y \in \{0,1,2,3,4,5,6\}$ is applied as an HARQ timing of a PDSCH sent to the UE on the downlink subframes in one FDD cell in the plurality of cells.

The step that the network and the UE agree that the HARQ timing of the PDSCH in the uplink-downlink configuration $Y \in \{0,1,2,3,4,5,6\}$ is applied may specifically include that:

at the network side, the network sends and schedules on a corresponding downlink subframe according to the timing of the uplink-downlink configuration Y, a PDSCH and downlink authorization for sending the PDSCH on the downlink subframe, and receives on the uplink subframes corresponding to the primary cell according to the timing of the uplink-downlink configuration Y, HARQ information of the PDSCH of the FDD cell; and at the UE side, the UE receives on a corresponding downlink subframe according to the timing of the uplink-downlink configuration Y, the downlink authorization of the PDSCH and the PDSCH, and sends on the uplink subframes corresponding to the primary cell according to the timing of the uplink-downlink configuration Y, HARQ information of the PDSCH of the FDD cell.

The Y may be specifically determined by any one of the following manners:

manner 1: for the FDD cell, when a downlink subframe of the downlink subframes on a radio frame is a subset of downlink subframes contained in the uplink-downlink configuration X, then Y=X;

manner 2: for the FDD cell, when a downlink subframe of the downlink subframes on a radio frame is a superset of downlink subframes contained in the uplink-downlink configuration X, it is required that the downlink subframe of the downlink subframes on the radio subframe is a subset of downlink subframes contained in uplink-downlink configuration Z, where $Z \in \{0,1,2,3,4,5,6\}$, and Y=Z at the moment; and manner 3: for the FDD cell, when a downlink subframe of the downlink subframes on a radio frame is neither a superset of downlink subframes contained in the uplink-downlink configuration X, nor a subset of downlink subframes contained in the uplink-downlink configuration X, it is required that the downlink subframe of the downlink subframes on the radio subframe is a subset of downlink subframes contained in uplink-downlink configuration Z, where $Z \in \{0,1,2,3,4,5,6\}$, and Y=M at the moment.

The method may further include that: in a scenario of the manner 3, when Y=M, it is required that an uplink subframe of uplink-downlink configuration M, where $M \in \{0,1,2,3,4,5,6\}$, is a subset of uplink subframes of the uplink-downlink configuration Z while requiring that the uplink subframe of the uplink-downlink configuration M is also a subset of uplink subframes of the uplink-downlink configuration X.

The method may further include that: when there are a plurality of Y values capable of being selected, a device at the network side makes an agreement with the UE to apply one of the Y values;

a way for selecting the Y includes that: it is agreed to apply a minimum Y value among the plurality of Y values, or a maximum Y value among the plurality of Y values, or an uplink-downlink configuration index corresponding to a minimum HARQ time delay;

or a way for selecting the Y includes that: a dynamical change occur according to an agreed condition and different uplink-downlink configuration indexes are applied at different moments.

A way for notifying that the network and the UE agree that the HARQ timing of the PDSCH in the uplink-downlink configuration $Y \in \{0,1,2,3,4,5,6\}$ is applied may include one of the followings:

a network layer notifies the UE by explicit signaling; and
the network side notifies the UE implicitly.

A data sending method in spectrum aggregation, in which a plurality of cells are configured for a UE and the plurality of cells at least include one TDD cell and at least one FDD cell;

when uplink aggregation is performed on the plurality of cells of different types, the method may include that:

uplink subframes are configured in each FDD cell for the UE, and it is agreed that the UE sends a PUSCH only on the configured uplink subframes while a network sends uplink authorization to the UE to send the PUSCH on the uplink subframes;

the network and the UE agree that the UE believes that there is no uplink authorization sent to the UE on one or more downlink subframes while there may be uplink authorization sent to the UE on a subframe besides the downlink subframes.

The method may further include that: the network and the UE agree to apply a HARQ timing of a PUSCH in uplink-downlink configuration P∈{0,1,2,3,4,5,6} as an HARQ timing for the UE to send the PUSCH on the uplink subframes in one FDD cell in the plurality of cells.

The step that the network and the UE agree to apply the HARQ timing of the PUSCH in the uplink-downlink configuration P∈{0,1,2,3,4,5,6} may specifically include that:

at the network side, the network sends and schedules on a corresponding downlink subframe according to the timing of the uplink-downlink configuration P, the uplink authorization for sending the PUSCH on the uplink subframes; and at the UE side, the UE detects on a corresponding downlink subframe according to the timing of the uplink-downlink configuration P, the uplink authorization for sending the PUSCH on the uplink subframes.

The method may further include that: the uplink authorization is sent through a PDCCH/a PHICH.

The P may be specifically determined by any one of the following manners:

manner 1: when the UE works in a non-cross carrier scheduling mode, for an FDD cell in the plurality of cells, when an uplink subframe of the uplink subframes on a radio frame is a subset of uplink subframes contained in uplink-downlink configuration Y, where Y∈{0,1,2,3,4,5,6}, then P=Y;

manner 2: when the UE works in a cross carrier scheduling mode, a PDCCH or a PHICH for scheduling the PUSCH which is sent on the uplink subframes of one FDD cell in the plurality of cells is in one TDD cell, wherein it is given that an uplink-downlink configuration of the TDD cell is configuration X, where X∈{0,1,2,3,4,5,6}; when an uplink subframe configured on one radio frame is a subset of uplink subframes contained in the uplink-downlink configuration X, and a Round Trip Time (RTT) of a PUSCH of the uplink-downlink configuration X is 10 ms, then P=X;

when the uplink subframe configured on one radio frame is not a subset of the uplink subframes contained in the uplink-downlink configuration X, or the RTT of the PUSCH of the uplink-downlink configuration X is not 10 ms, it is required that the uplink subframe configured on one radio frame is a subset of uplink subframes contained in uplink-downlink configuration Y, where Y∈{0,1,2,3,4,5,6}, where when X=0, Y=2, 4 or 5, then P=0;
when X=6, Y=2 or 5, then P=1; and
P=Y in other cases besides that X=0, and Y=2, 4 or 5, or X=6, and Y=2 or 5.

The method may further include that: when there are a plurality of P values capable of being selected, a device at the network side makes an agreement with the UE to apply one of the P values;

a way for selecting the P includes that: it is agreed to apply a minimum P value among the plurality of P values, or a maximum P value among the plurality of P values, or an uplink-downlink configuration index corresponding to a minimum HARQ time delay;

or a way for selecting the P includes that: a dynamical change occur according to an agreed condition, and HARQ timings of PUSCHs in different uplink-downlink configurations are applied.

The method may further include that: when there are a plurality of P values capable of being selected, for a P value that is capable of being agreed by a network side device and the UE to be applied, it is required that a downlink subframe in the uplink-downlink configuration P is a subset of downlink subframes in uplink-downlink configuration X;

when there are a plurality of P values that are capable of being selected, a device at the network side makes an agreement with the UE to apply one of the P values;

a way for selecting the P includes that: it is agreed to apply a minimum P value among the plurality of P values, or a maximum P value among the plurality of P values, or an uplink-downlink configuration index corresponding to a minimum HARQ time delay;

the way for selecting the P further includes that: the method changes dynamically according to an agreed condition and different uplink-downlink configuration indexes are applied at different moments.

A way for notifying that the network and the UE agree to apply the HARQ timing of the PUSCH in the uplink-downlink configuration P∈{0,1,2,3,4,5,6} includes any one of the followings:

a network layer notifies the UE by explicit signaling; and
the network side notifies the UE implicitly.

A data sending device in spectrum aggregation, the device including a configuring unit, configured to configure a plurality of cells for a UE, and the plurality of cells at least including one TDD cell and at least one FDD cell.

When downlink aggregation is performed on the plurality of cells of different types, the device further includes:

a first processing unit, configured to centralize and send downlink HARQ information of the plurality of cells on uplink subframes corresponding to one TDD cell among the plurality of cells, wherein the TDD cell is a primary cell while other cells are secondary cells and it is given that an uplink-downlink configuration of the primary cell is configuration X, where X∈{0,1,2,3,4,5,6};

a second processing unit, configured to configure downlink subframes in each FDD cell for the UE, and agree that a network sends a PDCCH/a PDSCH for the UE only on the configured downlink subframes while the UE detects and receives the PDCCH/PDSCH on the configured downlink subframes; or agree, by the network and the UE, that the UE believes that there is no PDCCH/PDSCH sent to the UE on one or more downlink subframes while there may be a PDCCH/PDSCH sent to the UE on a subframe besides the downlink subframes.

The second processing unit may further include a first timing agreeing module;

the first timing agreeing module is configured for the network and the UE to agree to apply an HARQ timing of a PDSCH in uplink-downlink configuration Y∈{0,1,2,3,4, 5,6} as an HARQ timing of a PDSCH sent on the downlink subframes to the UE in one FDD cell among the plurality of cells.

The first timing agreeing module may be further configured to agree that the network schedules and sends on a corresponding downlink subframe according to the timing of the uplink-downlink configuration Y, downlink authorization for sending the PDSCH on the downlink subframes and the PDSCH, and agree that the UE receives on a corresponding downlink subframe according to the timing of the uplink-downlink configuration Y, the PDSCH and the downlink authorization about the PDSCH and sends on the uplink subframes corresponding to the primary cell according to the timing of the uplink-downlink configuration Y, HARQ information of the PDSCH of the FDD cell.

The first timing agreeing module may be further configured to determine the Y by any one of the following manners:

manner 1: for the FDD cell, when a downlink subframe of the downlink subframes on a radio frame is a subset of downlink subframes contained in the uplink-downlink configuration X, then Y=X;

manner 2: for the FDD cell, when a downlink subframe of the downlink subframes on a radio frame is a superset of downlink subframes contained in the uplink-downlink configuration X, it is required that the downlink subframe of the downlink subframes on the radio subframe is a subset of downlink subframes contained in uplink-downlink configuration Z, where $Z \in \{0,1,2,3,4,5,6\}$ and Y=Z at the moment; and manner 3: for the FDD cell, when a downlink subframe of the downlink subframes on a radio frame is neither a superset of downlink subframes contained in the uplink-downlink configuration X nor a subset of downlink subframes contained in the uplink-downlink configuration X, it is required that the downlink subframe of the downlink subframes on the radio subframe is a subset of downlink subframes contained in uplink-downlink configuration Z, where $Z \in \{0,1,2,3,4,5,6\}$, and Y=M at the moment.

The first timing agreeing module may be further configured to, in a scenario of the manner 3 and when Y=M, require that an uplink subframe of uplink-downlink configuration M, where $M \in \{0,1,2,3,4,5,6\}$, is a subset of uplink subframes of the uplink-downlink configuration Z while requiring that the uplink subframe of the uplink-downlink configuration M is also a subset of uplink subframes of the uplink-downlink configuration X.

The first processing unit, the second processing unit, and the first timing agreeing module may be implemented by a Central Processing Unit (CPU), a Digital Signal Processor (DSP) or a Field-Programmable Gate Array (FPGA) when executing processing.

A data sending device in spectrum aggregation, the device including a configuring unit, configured to configure a plurality of cells for a UE, and the plurality of cells at least including one TDD cell and at least one FDD cell;

when uplink aggregation is performed on the plurality of cells of different types, the device further includes:

a third processing unit, configured to configure uplink subframes in each FDD cell for the UE, agree that the UE sends a PUSCH only on the configured uplink subframes while a network sends uplink authorization to the UE to send the PUSCH on the uplink subframes; or agree, by the network and the UE, that the UE believes that there is no uplink authorization sent to the UE on one or more downlink subframes while there may be uplink authorization sent to the UE on a subframe besides the downlink subframes.

The third processing unit may further include a second timing agreeing module, configured for the network and the UE to agree to apply an HARQ timing of a PUSCH in uplink-downlink configuration $P \in \{0,1,2,3,4,5,6\}$ as an HARQ timing for the UE to send the PUSCH on the uplink subframes in one FDD cell in the plurality of cells.

The second timing agreeing unit may be further configured to agree that the network sends and schedules, on a corresponding downlink subframe according to the timing of the uplink-downlink configuration P, the uplink authorization for sending the PUSCH on the uplink subframes; and agree that the UE detects, on a corresponding downlink subframe according to the timing of the uplink-downlink configuration P, the uplink authorization for sending the PUSCH on the uplink subframes.

The second timing agreeing unit may be further configured to determine the P in any one of the following manners:

manner 1: when the UE works in a non-cross carrier scheduling mode, for one FDD cell in the plurality of cells, when an uplink subframe of the uplink subframes on a radio frame is a subset of uplink subframes contained in uplink-downlink configuration Y, where $Y \in \{0,1,2,3,4,5,6\}$, then P=Y;

manner 2: when the UE works in a cross carrier scheduling mode, configuring an uplink-downlink configuration of one FDD cell among the plurality of cells as configuration X, where $X \in \{0,1,2,3,4,5,6\}$; a Physical Downlink Control Channel (PDCCH) or a Physical HARQ Indicator Channel (PHICH) for scheduling the PUSCH which is sent on the uplink subframes of one FDD cell in the plurality of cells is in one TDD cell, wherein it is given that an uplink-downlink configuration of the TDD cell is the configuration X, where $X \in \{0,1,2,3,4,5,6\}$; when an uplink subframe configured on one radio frame is a subset of uplink subframes contained in the uplink-downlink configuration X, and a Round Trip Time (RTT) of a PUSCH of the uplink-downlink configuration X is 10 ms, then P=X;

when the uplink subframe configured on one radio frame is not a subset of the uplink subframes contained in the uplink-downlink configuration X, or the RTT of the PUSCH of the uplink-downlink configuration X is not 10 ms, it is required that the uplink subframe configured on one radio frame is a subset of uplink subframes contained in uplink-downlink configuration Y, where $Y \in \{0,1,2,3,4,5,6\}$, where when X=0, Y=2, 4 or 5, then P=0;

when X=6, Y=2 or 5, then P=1; and

P=Y in other cases besides that X=0, and Y=2, 4 or 5, or X=6, and Y=2 or 5.

The third processing unit and the second timing agreeing unit may be implemented by a CPU, a DSP or an FPGA when executing processing.

A method of an embodiment of the present disclosure includes that: a plurality of cells are configured for a UE, and the plurality of cells at least include one TDD cell and at least one FDD cell, and the cells satisfy a time synchronization relation on time; when downlink aggregation is performed on the plurality of cells of different types, HARQ information of the plurality of cells is centralized and sent on uplink subframes corresponding to one TDD cell among the plurality of cells, wherein the TDD cell is a primary cell while other cells are secondary cells and it is given that an uplink-downlink configuration of the primary cell is configuration X, where $X \in \{0,1,2,3,4,5,6\}$, downlink subframes are configured in each FDD cell for a UE so that a network can send a PDCCH/a PDSCH for the UE only on the configured downlink subframes while the UE detects and receives the PDCCH/PDSCH on the configured downlink subframes. By applying the present disclosure, subframes are configured to send data when FDD aggregation and TDD aggregation are performed simultaneously, thus fully and effectively utilizing TDD and FDD resources while facilitating implementation of a base station and a terminal.

DETAILED DESCRIPTION

Implementation of the technical solutions will be further expounded hereinafter with reference to the accompanying drawings.

The following embodiments of the present disclosure elaborate an LTE/LTE-A TDD system and an LTE/LTE-A FDD system as examples. It needs to be noted here that: 1), uplink-downlink configurations involved in the embodiments of the present disclosure are 7 uplink-downlink configurations supported by the LTE/LTE-A TDD system and indexes of these 7 configurations are 0, 1, 2 . . . , 6. Specifically, an uplink-downlink configuration of a primary cell is also one of the 7 configurations above in the embodiments of the present disclosure. In other words, the expression "an uplink-downlink configuration of a primary cell is configuration X" involved herein actually means that the uplink-downlink configuration of the primary cell is uplink-downlink configuration X in the LTE/LTE-A TDD system, where $X \in \{0,1,2,3,4,5,6\}$. 2), a plurality of cells involved in the embodiments of the present disclosure are cells supported by the LTE/LTE-A TDD system. In other words, the expression "the plurality of cells at least include one TDD cell and at least one FDD cell" involved herein actually means that the plurality of cells at least include one LTE/LTE-A TDD cell and at least one LTE/LTE-A FDD cell.

Besides, parameters X, Y, P and Z involved herein refer to uplink-downlink configuration indexes supported by the LTE/LTE-A TDD system, and may be also agreed information X, Y, P and Z. However, the present disclosure is not limited to the LTE/LTE-A TDD system, other communication systems are also applicable, and the LTE/LTE-A TDD system is only described as an example here.

A data sending method in spectrum aggregation according to an embodiment of the present disclosure is a data sending solution in spectrum aggregation of a TDD system and an FDD system, mainly including the following content.

Figure 3:
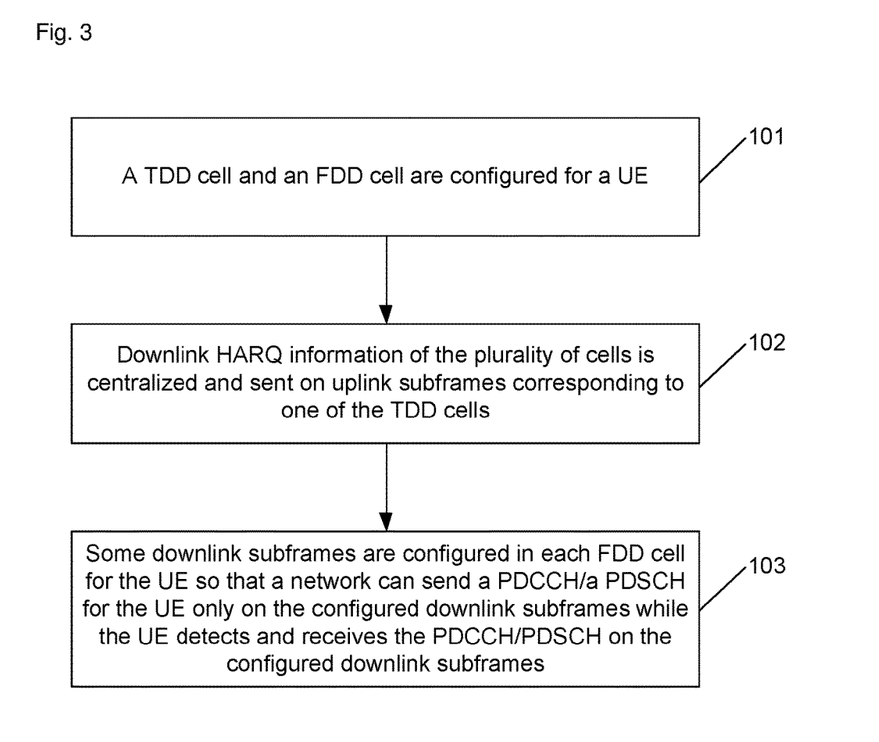
FIG. 3 is a schematic diagram of downlink spectrum aggregation and transmission according to the present disclosure.

In a scenario that downlink aggregation is performed on a plurality of cells (including at least one TDD cell and at least one FDD cell), as shown in FIG. 3, the method includes:

Step 101: A TDD cell and an FDD cell are configured for a UE.

Here, it is generally set that a network configures at least one TDD cell and at least one FDD cell for the UE so as to achieve the purpose of the present disclosure, and the cells satisfy a time synchronization relation in terms of time.

Step 102: Downlink HARQ information of the plurality of cells is centralized and sent on uplink subframes corresponding to one TDD cell among the plurality of cells.

Here, the TDD cell is called a primary cell, other cells are called secondary cells, and it is given that an uplink-downlink configuration of the primary cell is configuration X, where $X \in \{0,1,2,3,4,5,6\}$.

Step 103: Some downlink subframes are configured in each FDD cell for the UE so that a network can send a PDCCH/a PDSCH for the UE only on the configured downlink subframes while the UE detects and receives the PDCCH/PDSCH on the configured downlink subframes; or equivalently, the network and the UE appoints that the UE believes that there is no PDCCH/PDSCH sent to the UE on one or more downlink subframes while there may be a PDCCH/PDSCH sent to the UE on a subframe besides the downlink subframes.

Here, the step that some downlink subframes are configured for the UE means that the network can send the PDCCH/PDSCH for the UE only on these subframes while the UE detects and receives the PDCCH/PDSCH on these configured subframes.

It needs to be pointed out here that Step 102 and Step 103 are not necessarily performed according to a sequence, and the two may be exchanged and combined randomly.

Further, the network and the UE appoints that an HARQ timing of a PDSCH in uplink-downlink configuration $Y \in \{0, 1,2,3,4,5,6\}$ is applied as an HARQ timing of a PDSCH sent to the UE on the subframes in a certain FDD cell in the plurality of cells. In other words, at the network side, the network sends and schedules on a corresponding downlink subframe according to the timing of the uplink-downlink configuration Y, a PDSCH and downlink authorization for sending the PDSCH on the downlink subframe, and receives on the subframes corresponding to the primary cell according to the timing of the uplink-downlink configuration Y, HARQ information of the PDSCH of the FDD cell; and at the UE side, the UE receives on a corresponding downlink subframe according to the timing of the uplink-downlink configuration Y, the downlink authorization and the PDSCH, and sends on the subframes corresponding to the primary cell according to the timing of the uplink-downlink configuration Y, the HARQ information of the PDSCH of the FDD cell.

The agreed information Y may be determined by the following manners.

For the FDD cell, when a downlink subframe of the downlink subframes on a radio frame is a subset of downlink subframes contained in the uplink-downlink configuration X, then Y=X;

for the FDD cell, when a downlink subframe of the downlink subframes on a radio frame is a superset of downlink subframes contained in the uplink-downlink configuration X, it is required that the downlink subframe of the downlink subframes on the radio subframe is a subset of downlink subframes contained in uplink-downlink configuration Z, where $Z \in \{0,1,2,3,4,5,6\}$, Y=Z at the moment; and for the FDD cell, when a downlink subframe of the downlink subframes on a radio frame is neither a superset of downlink subframes contained in the uplink-downlink configuration X nor a subset of downlink subframes contained in the uplink-downlink configuration X, it is required that the downlink subframe of the downlink subframes on the radio subframe is a subset of downlink subframes contained in uplink-downlink configuration Z, where $Z\in\{0,1,2,3,4,5,6\}$, $Y=M$ at the moment.

It is required here that an uplink subframe of uplink-downlink configuration M, where $M\in\{0,1,2,3,4,5,6\}$, is a subset of uplink subframes of the uplink-downlink configuration Z while it is required that the uplink subframe of the uplink-downlink configuration M is also a subset of uplink subframes of the uplink-downlink configuration X.

When there are a plurality of Y values that can be selected, a device at the network side and the UE can make an agreement to apply one of the Y values. For example, the device at network side and the UE may agree to apply the minimum Y value among the plurality of Y values, or the maximum Y value among the plurality of Y values, or an uplink-downlink configuration index corresponding to the minimum HARQ time delay; or an uplink-downlink configuration index corresponding to subframes that can be scheduled with largest amount among the configured subframes; or may change dynamically according to an agreed condition and apply different uplink-downlink configuration indexes at different moments.

The network and the UE may agree to apply the HARQ timing of the PDSCH in the uplink-downlink configuration $Y\in\{0,1,2,3,4,5,6\}$ by many ways. For example, the UE is notified by explicit signaling such as high-layer signaling and physical-layer signaling, or may be also notified implicitly. For example, a certain mapping relation is created between the subframe configuration and an applied HARQ timing, and the network and the UE agree to apply the same mapping relation. In this way, after acquiring configuration information of the subframes, the UE also acquires HARQ timing information applied by the subframes.

An HARQ timing of the PDSCH sent to the UE on the downlink subframes in the TDD cell applies the timing of the LTE/LTE-A TDD system, which will not be described repeatedly here.

Uplink aggregation is performed on a plurality of cells (including at least one TDD cell and at least one FDD cell), HARQ information for the uplink aggregation is actually sent on a PDCCH or a PHICH, and a timing relation and a cell related to the transmission will be explained in details in the following descriptions.

Figure 4:
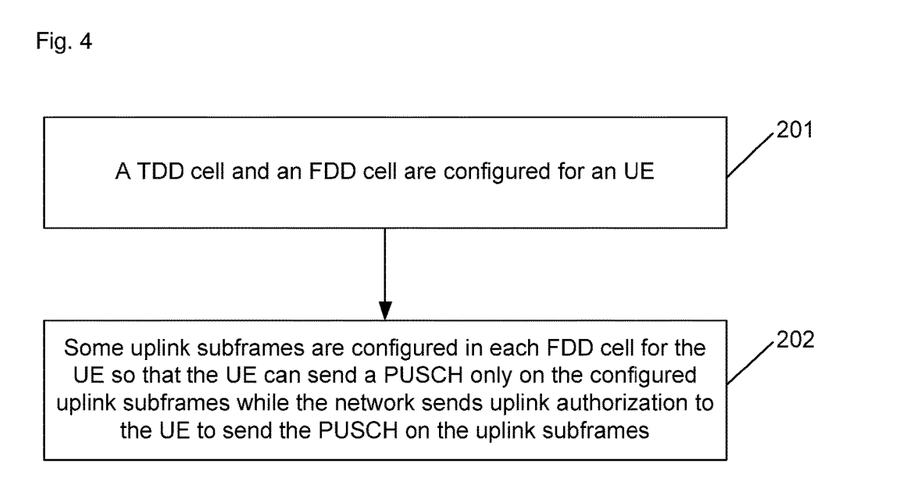
FIG. 4 is a schematic diagram of uplink spectrum aggregation and transmission according to the present disclosure.

As shown in FIG. 4, the method includes:

Step 201: A TDD cell and an FDD cell are configured for a UE.

Here, it is generally set that a network configures at least one TDD cell and at least one FDD cell for the UE so as to achieve the purpose of the present disclosure, and the cells satisfy a time synchronization relation in terms of time.

Step 202: Some uplink subframes are configured in each FDD cell for the UE so that the UE can send a PUSCH only on the configured uplink subframes while the network sends uplink authorization to the UE to send the PUSCH on the uplink subframes.

Here, the expression that some uplink subframes are configured for the UE means that the UE can send the PUSCH only on the subframes, and correspondingly, the network can only send, for the UE, the uplink authorization for sending the PUSCH on the subframes; or equivalently, the network and the UE appoint that the UE may believe that there is no uplink authorization sent to the UE on one or more downlink subframes while there may be uplink authorization sent to the UE on a subframe besides the subframes. After detecting uplink authorization outside the subframes, the UE should send the PUSCH on an uplink subframe corresponding to the uplink authorization while the network receives the PUSCH on the uplink subframe.

Further, the network and the UE agree to apply a HARQ timing of a PUSCH in uplink-downlink configuration $P\in\{0,1,2,3,4,5,6\}$ as an HARQ timing for the UE to send the PUSCH on the subframes in a certain FDD cell in the plurality of cells. In other words, at the network side, the network sends and schedules on a corresponding downlink subframe according to the timing of the uplink-downlink configuration P, the uplink authorization for sending the PUSCH on the uplink subframes; and at the UE side, the UE detects on a corresponding downlink subframe according to the timing of the uplink-downlink configuration P, the uplink authorization for sending the PUSCH on the subframes.

The uplink authorization may be sent through a PDCCH, or may be also sent through a PHICH.

The agreed information P may be determined according to the following manners.

When the UE works in a non-cross carrier scheduling mode, that is, when the PUSCH corresponding to the subframes and a PDCCH or PHICH for scheduling the PUSCH are in the same cell, for a certain FDD cell in the plurality of cells, when an uplink subframe of the uplink subframes on a radio frame is a subset of uplink subframes contained in uplink-downlink configuration Y, where $Y\in\{0,1,2,3,4,5,6\}$, then $P=Y$.

When the UE works in a cross carrier scheduling mode, that is the PDCCH or PHICH for scheduling the PUSCH which is sent on the uplink subframes is in the TDD cell, where it is given that an uplink-downlink configuration of the TDD cell is configuration X, where $X\in\{0,1,2,3,4,5,6\}$, wherein:

when the uplink subframe configured on one radio frame is a subset of uplink subframes contained in the uplink-downlink configuration X, and the RTT of a PUSCH of the uplink-downlink configuration X is 10 ms, then $P=X$;

when the uplink subframe configured on one radio frame is not a subset of the uplink subframes contained in the uplink-downlink configuration X, or the RTT of the PUSCH of the uplink-downlink configuration X is not 10 ms, it is required that the uplink subframe configured on one radio frame is a subset of uplink subframes contained in uplink-downlink configuration Y, where $Y\in\{0,1,2,3,4,5,6\}$, wherein:

$P=0$ when $X=0$, $Y=2$, 4 or 5;

$P=1$ when $X=6$, $Y=2$ or 5;

and $P=Y$ in other cases.

The network side device and the UE may make an agreement to apply one of the P values. For example, the network side device and the UE may agree to apply the minimum P value among the plurality of P values, or the maximum P value among the plurality of P values, or an uplink-downlink configuration index corresponding to the minimum HARQ time delay, or an uplink-downlink configuration index corresponding to the subframes that may be scheduled with the largest amount in the configured subframes.

Or a dynamical change may occur according to an agreed condition and different uplink-downlink configurations are applied at different moments.

When there are a plurality of P values that can be selected, for a P value that may be agreed by a network side device and the UE to be applied, it is required that a downlink subframe in the uplink-downlink configuration P is a subset of downlink subframes in uplink-downlink configuration X; if there are still a plurality of P values at the moment, processing may be performed by the manner above such as that "it is agreed to apply an HARQ timing of an PUSCH in an uplink-downlink configuration corresponding to the minimum value among the plurality of P values".

There are many ways for notifying that the network and the UE agree to apply the HARQ timing of the PUSCH in the uplink-downlink configuration P∈{0,1,2,3,4,5,6}. For example, the UE is notified by explicit signaling, such as higher-layer signaling and physical-layer signaling, or may be also notified implicitly. For example, a certain mapping relation is created between the subframe configuration and an applied HARQ timing, and the network and the UE agree to apply the same mapping relation. In this way, after acquiring configuration information of the subframes, the UE also acquires HARQ timing information applied by the subframes.

For the PDSCH sent by the UE on the uplink subframes in the TDD cell, an HARQ timing applies the HARQ timing of the LTE/LTE-A TDD system, which will not be described repeatedly here.

The subframe configuration above (including the configuration of the downlink subframes and the configuration of the uplink subframes) may be the same or different in each radio frame.

A data sending solution in spectrum aggregation of a TDD system and an FDD system according to the present disclosure can effectively implement aggregation of an FDD cell and a TDD cell, fully support and utilize cross carrier scheduling, thus keeping advantages of existing LTE-A FDD or TDD cell aggregation while having advantages of simple implementation and lowered cost for implementing a network and a terminal. It needs to be pointed out here that subframe configurations of different UEs in the present disclosure may be different, and the uplink and downlink may follow different timings of uplink-downlink configurations, thereby further improving the flexibility of aggregation of the FDD cell and the TDD cell, and providing more possibility to fully and effectively utilize TDD and FDD resources.

The present disclosure will be described below by illustrating specific examples.

Embodiment 1

A network performs downlink aggregation on two cells for a certain UE. One of the cells is a TDD cell and the other one is an FDD cell. An uplink-downlink configuration of the TDD cell is configuration 2. The network configures the TDD cell as a primary cell and the FDD cell as a secondary cell. Downlink HARQ information of the two cells is centralized and sent on uplink subframes corresponding to the primary cell. The network configures some downlink subframes of the FDD cell as subframes that may send a PSDCH to the UE, so as to improve the downlink data rate of the UE while reducing the complexity for the UE to detect the FDD cell. For example, downlink subframe 0, downlink subframe 1, downlink subframe 4, downlink subframe 5, downlink subframe 6 and downlink subframe 9 of each radio frame are configured as subframes that may send a PDSCH to the UE. It may be found that a downlink subframe of the downlink subframes on a radio frame is a subset of downlink subframes contained in uplink-downlink configuration 2.

For the FDD cell, the network notifies, at a transmitting end, the configuration information to the UE to agree to apply an HARQ timing of a PDSCH in the uplink-downlink configuration 2. According to the embodiment of the present disclosure, a downlink subframe of the downlink subframes on a radio frame is a subset of downlink subframes contained in the uplink-downlink configuration 2. The network determines HARQ timings of the downlink subframe 0, downlink subframe 1, downlink subframe 4, downlink subframe 5, downlink subframe 6 and downlink subframe 9 according to the HARQ timing of the PDSCH in the uplink-downlink configuration 2. For example, it is set that the FDD cell is in frame synchronization with the primary cell.

When sending a PDSCH on downlink subframe 0 of the FDD cell, the network should receive HARQ information of the PDSCH on subframe 7 of the radio frame of the primary cell.

When sending a PDSCH on downlink subframe 1 of the FDD cell, the network should receive HARQ information of the PDSCH on subframe 7 of the radio frame of the primary cell.

When sending a PDSCH on downlink subframe 4 of the FDD cell, the network should receive HARQ information of the PDSCH on subframe 2 of the next radio frame of the primary cell.

When sending a PDSCH on downlink subframe 5 of the FDD cell, the network should receive HARQ information of the PDSCH on subframe 2 of the next radio frame of the primary cell.

When sending a PDSCH on downlink subframe 6 of the FDD cell, the network should receive HARQ information of the PDSCH on subframe 2 of the next radio frame of the primary cell.

When sending a PDSCH on downlink subframe 9 of the FDD cell, the network should receive HARQ information of the PDSCH on subframe 7 of the next radio frame of the primary cell.

Accordingly, after receiving the configuration information from the network correctly at a receiving end, the UE should feed back HARQ information for the subframes according to an HARQ timing of the PDSCH in the uplink-downlink configuration 2. For example, the UE should feed back, on subframe 2 of a current radio frame, HARQ information for the PDSCHs of subframe 4, subframe 5 and subframe 6 of the last ratio frame.

The UE should feed back, on subframe 7 of the current radio frame, HARQ information of PDSCHs of subframe 9 of the last radio subframe and subframe 0 and subframe 1 of the current radio frame.

FIG. 4 provides a schematic diagram of the embodiment of the present disclosure in which a PDSCH is sent on a downlink subframe of the FDD cell and the UE sends an HARQ timing of HARQ information on the uplink of the TDD cell.

In the configured subframes, downlink subframe 0, downlink subframe 1, downlink subframe 4, downlink subframe 5, downlink subframe 6 and downlink subframe 9 of a certain radio frame are configured as subframes that may send a PDSCH to the UE. In practice, downlink subframe 0, downlink subframe 1, downlink subframe 4, downlink subframe 5, downlink subframe 6 and downlink subframe 9 of a plurality of radio frames may be also configured as subframes that may send a PDSCH to the UE. Further, subframe configurations of different radio frames may be the same or different. For example, downlink subframe 0, downlink subframe 1, downlink subframe 4, downlink subframe 5, downlink subframe 6 and downlink subframe 9 of a first radio frame of the FDD cell are configured as subframes that may send a PDSCH to the UE, and downlink subframe 0, downlink subframe 1, downlink subframe 4, downlink subframe 5, downlink subframe 6 and downlink subframe 9 of a first radio frame of the FDD cell are configured as subframes that may send a PDSCH to the UE, and downlink subframe 4, downlink subframe 5, downlink subframe 6, downlink subframe 7, downlink subframe 8 and downlink subframe 9 of a ninth radio frame are configured as subframes that may send a PDSCH to the UE. By applying the method of the present disclosure, the network and the UE may agree that the first radio frame applies the HARQ timing of the PDSCH in the uplink-downlink configuration 2 and agree that the ninth radio frame applies an HARQ timing of a PDSCH in uplink-downlink configuration 4, which will not be described repeatedly here.

For a PDSCH sent to the UE on a downlink subframe in the TDD cell, an HARQ timing may apply a timing of an existing LTE/LTE-A TDD system, which will not be described repeatedly here.

Embodiment 2

A network performs downlink aggregation on 5 cells for a certain UE, 2 cells are TDD cells, and 3 cells are FDD cells. One of the TDD cells is a primary cell, and it is given that an uplink-downlink configuration of the primary cell is configuration 1, and the other 4 cells are secondary cells. Downlink HARQ information of these 5 cells are centralized and sent on uplink subframes corresponding to the primary cell.

For the TDD cells, an HARQ timing of a PDSCH sent to the UE on a downlink subframe may apply a timing of an existing LTE/LTE-A TDD system, which will not be described repeatedly here.

For a first FDD cell, it is given that the network configures downlink subframe 0 of each radio frame as a subframe that may send a PDSCH to the UE.

For a second FDD cell, downlink subframe 0, downlink subframe 1, downlink subframe 3, downlink subframe 4, downlink subframe 5, downlink subframe 6, downlink subframe 8 and downlink subframe 9 of each radio frame are subframes that may send a PDSCH to the UE.

For a third FDD cell, downlink subframe 0, downlink subframe 1, and downlink subframe 8 of each radio frame are subframes that may send a PDSCH to the UE.

For the first FDD cell, it may be found that a subframe configured by the network is a subset of downlink subframes in the uplink-downlink configuration (configuration 1) of the primary cell. Therefore, an HARQ timing of a PDSCH sent on a downlink subframe of the cell to the UE may be processed by the method of the first embodiment, which will not be described repeatedly here.

For the second FDD cell, it may be found that a subframe configured by the network is a superset of downlink subframes in the uplink-downlink configuration (configuration 1) of the primary cell, and at the same time, it may be found that the configuration is a subset of downlink subframes in uplink-downlink configuration 2. Therefore, for the second FDD cell, the network notifies, at a transmitting end, the configuration information to the UE, and it is appointed to apply an HARQ timing of a PDSCH in the uplink-downlink configuration 2. According to the present disclosure, a downlink subframe of the downlink subframes on a radio frame is a subset of the downlink subframes contained in the uplink-downlink configuration 2. The network determines, according to the HARQ timing of the PDSCH in the uplink-downlink configuration 2, HARQ timings of downlink subframe 0, downlink subframe 1, downlink subframe 3, downlink subframe 4, downlink subframe 5, downlink subframe 6, downlink subframe 8 and downlink subframe 9.

When the network sends the PDSCH on downlink subframe 0 of the second FDD cell, the network should receive HARQ information of the PDSCH on subframe 7 of the radio frame of the primary cell.

When the network sends the PDSCH on downlink subframe 1 of the second FDD cell, the network should receive HARQ information of the PDSCH on subframe 7 of the radio frame of the primary cell.

When the network sends the PDSCH on downlink subframe 3 of the second FDD cell, the network should receive HARQ information of the PDSCH on subframe 7 of the radio frame of the primary cell.

When the network sends the PDSCH on downlink subframe 4 of the second FDD cell, the network should receive HARQ information of the PDSCH on subframe 2 of the next radio frame of the primary cell.

When the network sends the PDSCH on downlink subframe 5 of the second FDD cell, the network should receive HARQ information of the PDSCH on subframe 2 of the next radio frame of the primary cell.

When the network sends the PDSCH on downlink subframe 6 of the second FDD cell, the network should receive HARQ information of the PDSCH on subframe 2 of the next radio frame of the primary cell.

When the network sends the PDSCH on downlink subframe 8 of the second FDD cell, the network should receive HARQ information of the PDSCH on subframe 2 of the next radio frame of the primary cell.

When the network sends the PDSCH on downlink subframe 9 of the second FDD cell, the network should receive HARQ information of the PDSCH on subframe 7 of the next radio frame of the primary cell.

Accordingly, after receiving the configuration information from the network correctly at a receiving end, the UE should feed back HARQ information for the subframes according to the HARQ timing of the PDSCH in the uplink-downlink configuration 2. For example, the UE should feed back, on subframe 2 of a current radio frame of the primary cell, HARQ information of the PDSCHs of subframe 4, subframe 5, subframe 6 and subframe 8 of the last ratio frame of the second FDD cell.

The UE should feed back, on subframe 7 of the current radio frame of the primary cell, HARQ information of PDSCHs of subframe 9 of the last radio subframe of the second FDD cell, and subframe 0, subframe 1, and subframe 3 of the current radio frame of the second FDD cell.

Figure 5:
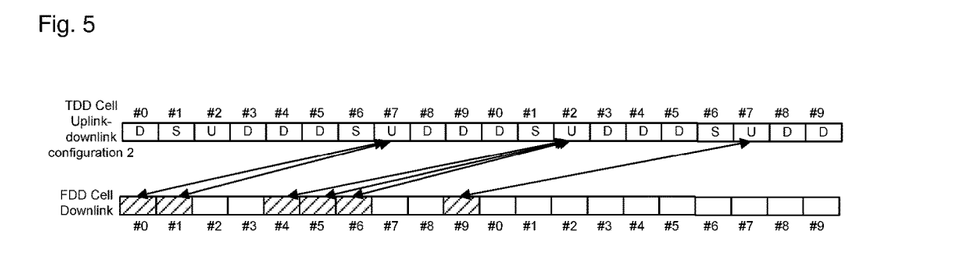
FIG. 5 is a schematic diagram of data transmission in aggregation of a TDD system and an FDD system according to an embodiment of the present disclosure.

FIG. 5 provides a schematic diagram of transmission of a PDSCH on a downlink subframe of the second FDD cell and an HARQ timing for the UE to send HARQ information on the uplink of the TDD cell.

For the second FDD cell, it may be further found that a subframe configured by the network is a subset of downlink subframes in uplink-downlink configuration 5. Therefore, the network and the UE may further determine, according to an HARQ timing of a PDSCH in the uplink-downlink configuration 5, HARQ timings of the downlink subframe 0, downlink subframe 1, downlink subframe 3, downlink subframe 4, downlink subframe 5, downlink subframe 6, downlink subframe 8 and downlink subframe 9.

In the case that there are many HARQ timings to be selected, the network and the UE agree to apply one of the timings, for example, both applying a timing with a smaller uplink-downlink configuration index.

For the third FDD cell, it may be found that a subframe configured by the network is neither a subset of the downlink subframes in the uplink-downlink configuration (configuration 1) of the primary cell, nor a superset of the downlink subframes in the uplink-downlink configuration (configuration 1) of the primary cell, but the configuration is a subset of downlink subframes in uplink-downlink configurations 2, 3, 4, and 5. According to the method of the present disclosure, the network and the UE may agree to determine, according to an HARQ timing of a PDSCH in the uplink-downlink configuration 2, 4 or 5, HARQ timings of the downlink subframe 0, downlink subframe 1 and downlink subframe 8. However, it should not be agreed that the HARQ timings of the downlink subframes are determined by an HARQ timing of a PDSCH in uplink-downlink configuration 3, because an uplink subframe of the uplink-downlink configuration 3 is not a subset of the uplink-downlink configuration 1.

Embodiment 3

A network aggregates 3 cells on uplink for a certain UE, one of the cells is a TDD cell and the other two are FDD cells, and the UE works in a non-cross carrier scheduling mode.

For a first FDD cell of the cells, it is given that the network configures uplink subframe 2, uplink subframe 3 and uplink subframe 7 of each radio frame as subframes that may send a PUSCH to the UE.

For a second FDD cell of the cells, it is given that the network configures uplink subframe 2, and uplink subframe 3 of each radio frame as subframes that may send a PUSCH to the UE.

The uplink subframes of the first FDD cell form a subset of uplink subframes contained in uplink-downlink configuration 1. The network and the UE may agree to apply an HARQ timing of a PUSCH in the uplink-downlink configuration 1 as HARQ timings of PUSCHs sent by the UE on the subframes. For example, at the network side, if the network detects, on uplink subframe 2, a PUSCH sent by the UE, the network should send HARQ information of the PUSCH on downlink subframe 6 of the same radio frame of the cell.

at the network side, if the network detects, on uplink subframe 3, a PUSCH sent by the UE, the network should send HARQ information of the PUSCH on downlink subframe 9 of the same radio frame of the cell.

at the network side, if the network detects, on uplink subframe 7, a PUSCH sent by the UE, the network should send HARQ information of the PUSCH on downlink subframe 1 of the next radio frame of the cell.

Figure 6:
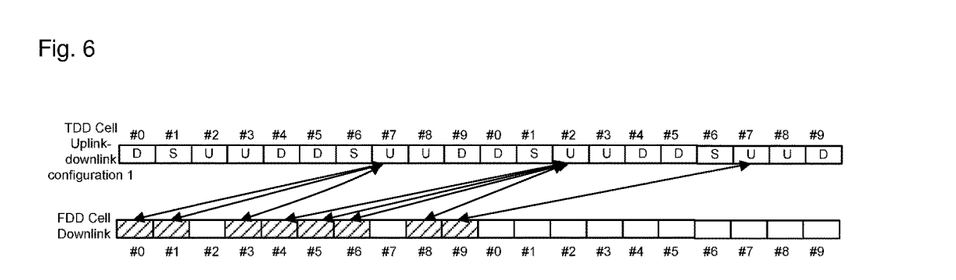
FIG. 6 is another schematic diagram of data transmission in aggregation of a TDD system and an FDD system according to an embodiment of the present disclosure.

At the UE side, if the UE detects, on downlink subframe 1, uplink authorization information sent by the network, the UE should send a corresponding PUSCH on uplink subframe 7 of the radio frame;

if the UE detects, on downlink subframe 6, uplink authorization information sent by the network, the UE should send a corresponding PUSCH on uplink subframe 2 of the next radio frame of the ratio frame;

if the UE detects, on downlink subframe 9, uplink authorization information sent by the network, the UE should send a corresponding PUSCH on uplink subframe 3 of the next radio frame of the ratio frame. FIG. 6 provides a schematic diagram of application of an HARQ timing of a PUSCH of the first FDD cell according to the present disclosure.

Besides, the uplink subframes also form a subset of uplink subframes contained in uplink-downlink configurations 0 and 6. Therefore, both the network and the UE may agree to apply an HARQ timing of a PUSCH in the uplink-downlink configuration 0 or the uplink-downlink configurations 6.

There are many manners for the network and the UE to agree to apply an HARQ timing of a PUSCH in the uplink-downlink configuration 0, 6 or 1. For example, the UE is notified by explicit signaling such as signaling of a higher layer and signaling of a physical layer, or may be also notified implicitly. For example, a certain mapping relation is created between the subframe configuration and an applied HARQ timing, and the network and the UE agree to apply the same mapping relation. In this way, after acquiring configuration information of the subframes, the UE also acquires HARQ timing information applied by the subframes.

When HARQ timing relations of PUSCHs in a plurality of uplink-downlink configurations may be selected, a network side device and the UE may agree to apply one of them. For example, it may be agreed that an HARQ timing of a PUSCH in an uplink-downlink configuration corresponding to the minimum P value among the plurality of P values is applied, or an HARQ timing of a PUSCH in an uplink-downlink configuration corresponding to the maximum P value among the plurality of P values is applied, or an HARQ timing relation of a PUSCH in an uplink-downlink configuration corresponding to the smallest HARQ time delay is applied, or the network side device and the UE may change dynamically according to an agreed condition to apply HARQ timings of PUSCHs in different uplink-downlink configurations at different moments.

For the second FDD cell, the uplink subframes form a subset of uplink subframes contained in uplink-downlink configurations 0, 1, 3, 4 or 6. Therefore, the network and the UE may agree to apply an HARQ timing of a PUSCH in uplink-downlink configurations 0, 1, 3, 4 or 6 according to a method as that for the first FDD cell, which will not be described repeatedly here.

For the TDD cell, an HARQ timing of an existing LTE/LTE-A TDD system may be applied as an HARQ timing of a PUSCH sent by the UE on an uplink subframe, which will not be described repeatedly here.

Embodiment 4

A network performs uplink aggregation on 5 cells for a certain UE, 2 cells are TDD cells, 3 cells are FDD cells, and the UE works in a cross carrier scheduling mode. For a first FDD cell and a second FDD cell, uplink authorization (a PDCCH or a PHICH) about PUSCHs on these cells is scheduled and sent in the first TDD cell, and for a third FDD cell, uplink authorization (a PDCCH or a PHICH) about a PUSCH on the cell is scheduled and sent in the second FDD cell. Uplink-downlink configurations of a first TDD cell and a second TDD cell are uplink-downlink configurations 6 and 1 respectively.

For the first FDD cell, it is given that the network configures uplink subframe 2 of each radio subframe as a subframe that may send a PUSCH to the UE.

For the second FDD cell, it is given that the network configures uplink subframe 2, subframe 3 and subframe 4 of each radio subframe as subframes that may send a PUSCH to the UE.

For the third FDD cell, it is given that the network configures uplink subframe 2 and subframe 8 of each radio subframe as subframes that may send a PUSCH to the UE.

For the first FDD cell, an uplink subframe configured by the network is a subset of uplink-downlink configuration 5, and it is then considered that the uplink authorization (the PDCCH or the PHICH) about the PUSCH on the cell is scheduled and sent on the first TDD cell (uplink-downlink configuration 6). The RTT of a PUSCH of the uplink-downlink configuration 6 is not 10 ms. According to the present disclosure, the network and the UE may agree to apply an HARQ timing of a PUSCH in the uplink-downlink configuration 1. We may also find that the uplink subframes configured by the network also form a subset of uplink subframes contained in other uplink-downlink configurations. Therefore, the network and the UE may further agree to apply an HARQ timing in the other uplink-downlink configurations. If HARQ timings of PUSCHs in a plurality of uplink-downlink configurations may be selected, the network may further select an optimal timing according to some simple principles. For example, the network may select an optimal timing according to a principle that the number of subframes that may be scheduled is largest. We may find that the network and the UE agree to apply HARQ timings in PUSCHs in uplink-downlink configurations 0, 1 and 6. HARQ timings for the configured subframes are the same. However, if the network and the UE agree to apply HARQ timings of PUSCHs in uplink-downlink configurations 3, 4 and 5, it is considered that subframes scheduled in these configurations may be uplink subframes in the first TDD cell. In other words, the network cannot schedule the uplink subframes of the FDD cells. However, these poor HARQ timings may be excluded easily according to the principle that "the number of subframes that may be scheduled is largest". Of course, these poor HARQ timings may be also excluded easily according to the fact that "it is required that the downlink subframe of the configuration is also a subset of downlink subframes in the uplink-downlink configuration of the first TDD cell", which will not be described repeatedly here.

For the second FDD cell, an uplink subframe configured by the network is a subset of the uplink-downlink configuration 0, and it is then considered that the uplink authorization (the PDCCH or the PHICH) about the PUSCH on the cell is scheduled and sent on the first FDD cell (uplink-downlink configuration 6). The RTT of the PUSCH of the uplink-downlink configuration 6 is not 10 ms. According to the present disclosure, the network and the UE may agree to apply the HARQ timing of the PUSCH in the uplink-downlink configuration 0.

Figure 7:
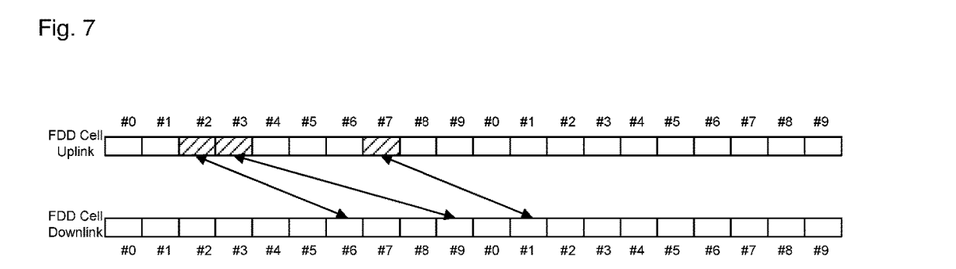
FIG. 7 is still another schematic diagram of data transmission in aggregation of a TDD system and an FDD system according to an embodiment of the present disclosure.
Figure 8:
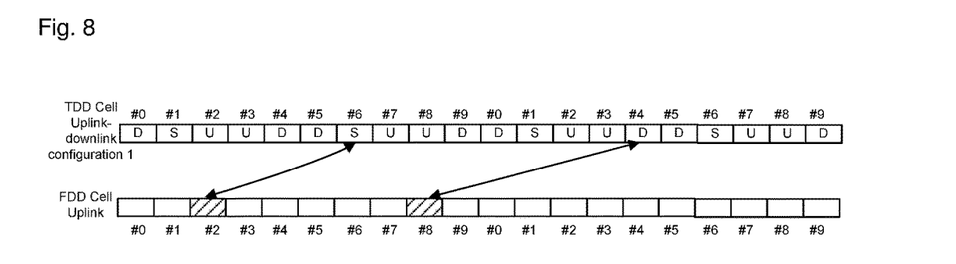
FIG. 8 is still another schematic diagram of data transmission in aggregation of a TDD system and an FDD system according to an embodiment of the present disclosure.

A PUSCH of the third FDD cell is scheduled by the second TDD cell across carriers (uplink-downlink configuration 1), and it is considered that an uplink subframe configured by the network in the third FDD cell is a subset of the uplink-downlink configuration 1 and the RTT in the PUSCH in the uplink-downlink configuration 1 is 10 ms. According to the present disclosure, the network and the UE may agree to apply the HARQ timing of the PUSCH in the uplink-downlink configuration 1. FIG. 7 provides a schematic diagram of application of an HARQ timing of a PUSCH of the third FDD cell of the present disclosure.

For the TDD cells, an HARQ timing of a PUSCH sent by the UE on an uplink subframe may apply an HARQ timing of an existing LTE/LTE-A TDD system, and will not be described repeatedly here.

What are described above are only embodiments of the present disclosure, but are not for limiting the present disclosure. To those skilled in the art, the present disclosure may have various alternations and changes. Any modifications, equivalent substitutions and improvements within the spirit and principle of the present disclosure should be within scope of the claims of the present disclosure. For example, a system applied in the present disclosure is not limited to an LTE system.

If implemented in a form of a software functional module and sold or used as an independent product, the integrated modules of the embodiments of the present disclosure may be also stored in a computer-readable storage medium. Based on such understanding, the technical solutions of the embodiments of the present disclosure substantially or the parts contributing to the traditional art may be embodied in a form of a software product. The computer software product is stored in a storage medium including a number of instructions for enabling a computer device (such as a personal computer, a server or a network device etc.) to perform all or a part of the methods according to various embodiments of the present disclosure. The storage medium described above includes various media which can store program codes, such as a Universal Serial Bus (USB) disk, a mobile storage device, a Read-Only Memory (ROM), a Random Access Memory (RAM), a magnetic disk or an optical disk. In this way, the embodiments of the present disclosure are not limited to any specific combination of hardware and software.

Accordingly, an embodiment of the present disclosure further provides a computer storage medium in which a computer program is stored. The computer program is used for executing a data sending method in spectrum aggregation according to an embodiment of the present disclosure.

What are described above are only preferred embodiments of the present disclosure, but are not used for limiting the protection scope of the present disclosure.

INDUSTRIAL APPLICABILITY

A method of an embodiment of the present disclosure includes that: a plurality of cells are configured for a UE, and the plurality of cells at least include one TDD cell and at least one FDD cell, and the cells satisfy a time synchronization relation in terms of time; when downlink aggregation is performed on the plurality of cells of different types, HARQ information of the plurality of cells is centralized and sent on uplink subframes corresponding to a TDD cell among the plurality of cells, wherein the TDD cell is a primary cell while other cells are secondary cells and it is given that an uplink-downlink configuration of the primary cell is configuration X, where $X \in \{0,1,2,3,4,5,6\}$, downlink subframes are configured on each FDD cell for a UE so that a network can send a PDCCH/a PDSCH for the UE only on the configured downlink subframes while the UE detects and receives the PDCCH/PDSCH on the configured downlink subframes. By applying the present disclosure, subframes are configured to send data when FDD aggregation and TDD aggregation are performed simultaneously, thus fully and effectively utilizing TDD and FDD resources while facilitating implementation of a base station and a terminal.

What is claimed is:

1. A data sending method in spectrum aggregation, a plurality of cells being configured for a User Equipment (UE) and the plurality of cells comprising at least one Time Division Duplex (TDD) cell and at least one Frequency Division Duplex (FDD) cell;

when uplink aggregation is performed on the plurality of cells of different types, the method comprising:

configuring uplink subframes in each FDD cell for the UE, and agreeing that the UE sends a Physical Uplink Share Channel (PUSCH) only on the configured uplink subframes while a network sends uplink authorization to the UE to send the PUSCH on the uplink subframes; or agreeing, by the network and the UE, that the UE believes that there is no uplink authorization sent to the UE on one or more downlink subframes while there may be uplink authorization sent to the UE on a subframe besides the downlink subframes; and agreeing, by the network and the UE, that a Hybrid Automatic Repeat Quest (HARQ) timing of a PUSCH in uplink-downlink configuration P∈{0,1,2,3,4,5,6} is applied as a HARQ timing for the UE to send the PUSCH on the uplink subframes in one FDD cell in the plurality of cells;

wherein the P is specifically determined in any one of following manners:

manner 1: when the UE works in a non-cross carrier scheduling mode, for one FDD cell in the plurality of cells, when an uplink subframe of the uplink subframes on a radio frame is a subset of uplink subframes contained in uplink-downlink configuration Y, where Y∈{0,1,2,3,4,5,6}, then P=Y;

manner 2: when the UE works in a cross carrier scheduling mode, a PDCCH or a PHICH for scheduling the PUSCH which is sent on the uplink subframes of one FDD cell in the plurality of cells is in one TDD cell, wherein it is given that an uplink-downlink configuration of the TDD cell is configuration X, where X∈{0, 1,2,3,4,5,6}; when an uplink subframe configured on one radio frame is a subset of uplink subframes contained in the uplink-downlink configuration X, and a Round Trip Time (RTT) of a PUSCH of the uplink-downlink configuration X is 10 ms, then P=X;

when the uplink subframe configured on one radio frame is not a subset of the uplink subframes contained in the uplink-downlink configuration X, or the RTT of the PUSCH of the uplink-downlink configuration X is not 10 ms, requiring that the uplink subframe configured on one radio frame is a subset of uplink subframes contained in uplink-downlink configuration Y, where Y∈{0,1,2,3,4,5,6}, where when X=0, Y=2, 4 or 5, then P=0;

when X=6, Y=2 or 5, then P=1; and

P=Y in other cases besides that X=0, and Y=2, 4 or 5, or X=6, and Y=2 or 5.

2. The method according to claim 1, wherein agreeing, by the network and the UE, to apply the HARQ timing of the PUSCH in the uplink-downlink configuration P∈{0,1,2,3, 4,5,6} specifically comprises:

at the network side, sending and scheduling, by the network, on a corresponding downlink subframe according to a timing of the uplink-downlink configuration P, the uplink authorization for sending the PUSCH on the uplink subframes; and at the UE side, detecting, by the UE, on a corresponding downlink subframe according to the timing of the uplink-downlink configuration P, the uplink authorization for sending the PUSCH on the uplink subframes.

3. The method according to claim 2, further comprising: sending the uplink authorization through a Physical Downlink Control Channel (PDCCH)/a Physical HARQ Indicator Channel (PHICH).

4. The method according to claim 2, further comprising: when there are a plurality of P values capable of being selected, making, by a device at the network side, an agreement with the UE to apply one of the P values;

a way for selecting the P comprises: agreeing to apply a minimum P value among the plurality of P values, or a maximum P value among the plurality of P values, or an uplink-downlink configuration index corresponding to a minimum HARQ time delay;

or a way for selecting the P comprises: changing dynamically according to an agreed condition, and applying HARQ timings of PUSCHs in different uplink-downlink configurations adopted at different moments.

5. The method according to claim 2, further comprising: when there are a plurality of P values capable of being selected, for a P value that is capable of being agreed by a device at the network side and the UE to be applied, requiring that a downlink subframe in the uplink-downlink configuration P is a subset of downlink subframes in uplink-downlink configuration X;

when there are a plurality of P values that are capable of being selected, making, by the device at the network side, an agreement with the UE to apply one of the P values;

a way for selecting the P comprises: agreeing to apply a minimum P value among the plurality of P values, or a maximum P value among the plurality of P values, or an uplink-downlink configuration index corresponding to a minimum HARQ time delay;

the way for selecting the P further comprises: changing dynamically according to an agreed condition and applying different uplink-downlink configuration indexes at different moments.

6. The method according to claim 1, wherein a way for notifying that the network and the UE agree to apply the HARQ timing of the PUSCH in the uplink-downlink configuration P∈{0,1,2,3,4,5,6} comprises any one of the followings:

notifying, by the network, the UE by explicit signaling; and notifying, by the network, the UE implicitly.

7. A data sending device in spectrum aggregation, the device comprising a processor and a memory for storing instructions executed by the processor; wherein the processor is arranged to configure a plurality of cells for a User Equipment (UE), and the plurality of cells comprising at least one Time Division Duplex (TDD) cell and at least one Frequency Division Duplex (FDD) cell;

when uplink aggregation is performed on the plurality of cells of different types, the processor is further arranged to:

configure uplink subframes in each FDD cell for the UE, agree that the UE sends a Physical Uplink Share Channel (PUSCH) only on the configured uplink subframes while a network sends uplink authorization to the UE to send the PUSCH on the uplink subframes; or agree, by the network and the UE, that the UE believes that there is no uplink authorization sent to the UE on one or more downlink subframes while there may be uplink authorization sent to the UE on a subframe besides the downlink subframes; and agree, by the network and the UE, that a Hybrid Automatic Repeat Quest (HARQ) timing of a PUSCH in uplink-downlink configuration P∈{0,1,2,3,4,5,6} is applied as a HARQ timing for the UE to send the PUSCH on the uplink subframes in one FDD cell in the plurality of cells; and the processor is further arranged to determine the P in any one of following manners:

manner 1: when the UE works in a non-cross carrier scheduling mode, for one FDD cell in the plurality of cells, when an uplink subframe of the uplink subframes on a radio frame is a subset of uplink subframes contained in uplink-downlink configuration Y, where $Y \in \{0,1,2,3,4,5,6\}$, then P=Y;

manner 2: when the UE works in a cross carrier scheduling mode, configuring an uplink-downlink configuration of one FDD cell among the plurality of cells as configuration X, where $X \in \{0,1,2,3,4,5,6\}$; a Physical Downlink Control Channel (PDCCH) or a Physical HARQ Indicator Channel (PHICH) for scheduling the PUSCH which is sent on the uplink subframes of one FDD cell in the plurality of cells is in one TDD cell, wherein it is given that an uplink-downlink configuration of the TDD cell is the configuration X, where $X \in \{0,1,2,3,4,5,6\}$; when an uplink subframe configured on one radio frame is a subset of uplink subframes contained in the uplink-downlink configuration X, and a Round Trip Time (RTT) of a PUSCH of the uplink-downlink configuration X is 10 ms, then P=X;

when the uplink subframe configured on one radio frame is not a subset of the uplink subframes contained in the uplink-downlink configuration X, or the RTT of the PUSCH of the uplink-downlink configuration X is not 10 ms, requiring that the uplink subframe configured on one radio frame is a subset of uplink subframes contained in uplink-downlink configuration Y, where $Y \in \{0,1,2,3,4,5,6\}$, where when X=0, Y=2, 4 or 5, then P=0;

when X=6, Y=2 or 5, then P=1; and

P=Y in other cases besides that X=0, and Y=2, 4 or 5, or X=6, and Y=2 or 5.

8. The device according to claim 7, wherein the processor is further arranged to agree that the network sends and schedules, on a corresponding downlink subframe according to a timing of the uplink-downlink configuration P, the uplink authorization for sending the PUSCH on the uplink subframes; and agree that the UE detects, on a corresponding downlink subframe according to the timing of the uplink-downlink configuration P, the uplink authorization for sending the PUSCH on the uplink subframes.

* * * * *